(12) United States Patent
Hu et al.

(10) Patent No.: US 9,771,904 B2
(45) Date of Patent: Sep. 26, 2017

(54) SELF-CLEANING AIR FILTERING MATERIAL AND PREPARATION METHOD THEREFOR

(75) Inventors: Jian Hu, Guangzhou (CN); Yun Liang, Guangzhou (CN); Yi Wang, Guangzhou (CN); Jingshan Zeng, Guangzhou (CN)

(73) Assignee: Fibrway Materials Science & Technology Development Co., Ltd., Guangdong (CN)

( * ) Notice: Subject to any disclaimer, the term of this patent is extended or adjusted under 35 U.S.C. 154(b) by 343 days.

(21) Appl. No.: 14/396,530

(22) PCT Filed: Apr. 25, 2012

(86) PCT No.: PCT/CN2012/074682
§ 371 (c)(1),
(2), (4) Date: Jan. 12, 2015

(87) PCT Pub. No.: WO2013/159298
PCT Pub. Date: Oct. 31, 2013

(65) Prior Publication Data
US 2015/0211453 A1    Jul. 30, 2015

(51) Int. Cl.
*B01D 46/00* (2006.01)
*F02M 35/08* (2006.01)
*B01D 39/16* (2006.01)

(52) U.S. Cl.
CPC ....... *F02M 35/086* (2013.01); *B01D 39/1607* (2013.01); *B01D 46/0067* (2013.01); *B01D 2239/025* (2013.01); *B01D 2239/0654* (2013.01)

(58) Field of Classification Search
CPC .. B01D 39/14–39/2096; B01D 46/00–46/546; B01D 2239/00–2239/1291
USPC ............................ 55/302, 522–528; 427/180
See application file for complete search history.

(56) References Cited

U.S. PATENT DOCUMENTS

2010/0285101 A1* 11/2010 Moore ...................... B32B 5/14
424/445

* cited by examiner

*Primary Examiner* — T. Bennett McKenzie
(74) *Attorney, Agent, or Firm* — Lewis Roca Rothgerber Christie LLP

(57) ABSTRACT

Provided are a self-cleaning air filtering material and a preparation method therefor. The air filtering material comprises: a submicron fiber layer (2) at an inflow surface for surface filtration, a supporting area (3) for supporting and a mixed area (5) between the submicron fiber layer (2) and the supporting area (3), wherein the mixed area (5) is formed by contacting and mixing part of the fibers in the submicron fiber layer (2) and the supporting area (3) with each other during the one-step formation of the submicron fiber layer (2) and the supporting area (3) by passing through a double-layer headbox.

9 Claims, 2 Drawing Sheets

SELF-CLEANING AIR FILTERING MATERIAL AND PREPARATION METHOD THEREFOR

CROSS-REFERENCE TO RELATED APPLICATION(S)

This application is a National Phase Patent Application and claims priority to and benefit of International Application Number PCT/CN2012/074682, filed on Apr. 25, 2012, the entire disclosure of which is incorporated herein by reference.

TECHNICAL FIELD

The present invention belongs to the technical field of filtration, relates to a self-cleaning air filtering material and preparation method therefor.

BACKGROUND

Air filtering materials are commonly used in the air purification systems such as air circulation systems and air intake filters for internal combustion engines. With the rapid development of the modern industry, the requirement to the cleanliness of the environment has become more and more high, in order to achieve high level of air cleanliness, the requirement to the filtration performance of the filtering materials selected has become more and more high. To meet the demand, some composite filtering materials emerge. The electrospun layer formed by the conventional electrospinning technology has too weak strength and poor durability, and is also easily peeled off or damaged; while the meltblown fiber layer formed by the meltblowing technology also has poor strength, and is easily fluff and damaged during the process of processing. Furthermore, the meltblown fiber layers formed by the meltblowing technology are bonded by forming the substrate and meltblown layer respectively and then performing recompounding, resulting in poor bonding strength between layers, and delamination and peeling easily occurs during the process of processing and use.

Therefore, it is still needed to provide a new air filtering material and preparation method therefor.

SUMMARY

One object of the present invention is to provide a self-cleaning air filtering material.

Another object of the present invention is to provide a method for preparing the above self-cleaning air filtering material.

The objects of the present invention are achieved by the following technical solutions.

In one aspect, the present invention provides a self-cleaning air filtering material, the air filtering material comprises a submicron fiber layer, a supporting area and a mixed area between the submicron fiber layer and the supporting area, wherein the mixed area is formed by contacting and mixing part of fibers in the submicron fiber layer and the supporting area with each other during the formation of the submicron fiber layer and the supporting area. The mixed area is characterized in that it contains both submicron fibers and fibers of the supporting area, the presence of the mixed area enables the submicron fiber layer and the supporting area to possess the desired bonding strength, and makes the peeling and delamination not easily occur during the process of processing and use. The submicron fiber refers to a fiber having a diameter of less than 1 µm.

Preferably, the submicron fiber layer is made of submicron grade fibers such as fibrillated submicron fibers.

Preferably, the fibrillated submicron fibers are fibers capable of producing fibrils and selected from one or more of the group consisting of tencel fibers, Richcel fibers and aramid fibers.

Preferably, the beating degree of the fibrillated submicron fibers is 20° SR-95° SR.

Preferably, the fibrillated submicron fibers have an average fiber length of 0.1 mm-5 mm, and an average diameter of 20 nm-1000 nm.

Preferably, the main trunk fibers in the fibrillated submicron fibers have an average length of 0.1 mm-10 mm, and an average diameter of 0.5 µm-15 µm. The process of fibrillation is a process where the fibers having a fibril structure are acted upon by a mechanical force and fibrils are gradually peeled off from the main trunk fibers. In the process of fibrillation, some fibrils may be completely peeled off from the main trunk fibers, and some fibrils may be partly peeled off from the main trunk fibers.

Preferably, the supporting area is made of plant fibers and/or non-plant fibers.

Preferably, the plant fibers are selected from one or more of the group consisting of wood fibers, grass fibers, cotton fibers, bast fibers, mercerized fibers and other plant fibers.

Preferably, the plant fibers have an average fiber length of 0.5 mm-10 mm and an average diameter of 5 µm-30 µm.

Preferably, the non-plant fibers are selected from one or more of the group consisting of nylon fibers, polyester fibers, polypropylene fibers, aramid fibers, acrylic fibers, polytetrafluoroethylene fibers, polyvinyl alcohol fibers, tencel fibers, Richcel fibers, glass fibers and other non-plant fibers.

Preferably, the non-plant fibers have an average fiber length of 0.5 mm-10 mm and an average diameter of 5 µm-20 µm.

Preferably, the basis weight of the submicron fiber layer is 0.1 g/m²-10 g/m², and the basis weight of the supporting area is 10 g/m²-150 g/m².

In another aspect, the present invention provides a method for preparing the above self-cleaning air filtering material, the method comprises: forming the submicron fiber layer and the supporting area at the same time by a double-layer headbox.

Preferably, forming the submicron fiber layer and the supporting area at the same time comprises the following steps of:

transmitting fiber suspensions for the submicron fiber layer and the supporting area to a forming wire by a double-layer headbox, wherein the fiber suspension for the supporting area arrives at the forming wire prior to the fiber suspension for the submicron fiber layer so that the submicron fiber layer can be formed on the supporting area; during the process of formation, contacting and mixing part of fibers between the submicron fiber layer and the supporting area with each other to form the mixed area containing both the submicron fibers and fibers of the supporting area.

Preferably, the self-cleaning air filtering material performs self-cleaning preferably through blowing by back-flushing air stream, or performs self-cleaning by other manners in which dust adhered to the filtering material is made to come off through a mechanical force.

In summary, the air filtering material which performs self-cleaning through back-blowing to extend the service life has a structure consisting of a submicron fiber layer acting as an inflow surface, a mixed area, and a supporting area for supporting. The submicron fiber layer and the supporting area of the air filtering material are formed in one step by a double-layer headbox, this method can perform adjusting flexibly and conduct wide range control on the performances, without needing to compound twice, and the mixed area containing the submicron fibers and the fibers of the supporting area is formed between the submicron fiber layer and the supporting area. In the mixed area, the submicron fibers and the fibers of the supporting area are bonded by the natural interleaving manner through the bonding force between fibers, with a certain bonding strength and no obvious interface. Meanwhile, since surface filtration can be easily achieved by the submicron fiber layer, and the drag force acted upon the submicron fibers are often lower than the force acted upon the large particles captured by the submicron fibers, therefore the particles filtered by the submicron fiber layer can be easily blown off by back-flushing air stream to restore the filtration performance, therefore the filtering material which uses the submicron fiber layer as an inflow surface is very suitable for the self-cleaning filter system and has a high initial precision.

Therefore the air filtering material provided by the present invention can achieve the surface filtration and high-precision filtration of the submicron fibers, thereby meeting the requirements on the self-cleaning air filtering material. In addition, the present invention applies the technology of one-step formation by a double-layer headbox to the manufacture for the self-cleaning air filtering material which is compounded by the submicron fibers for the first time, the technology can perform adjusting flexibly and conduct wide range control on the performances, and the manufactured self-cleaning air filtering material which is compounded by the submicron fibers has comparable filtration performances to the existing products, but has better processing and service performances, this especially behaves in that the submicron fiber layer is processed conveniently, and not easy to be damaged and delaminated when bonded with the substrate. In contrast, the submicron fiber layer (electrospun layer) formed by the electrospinning technology has too weak strength and poor durability, and is also easily peeled off or damaged; while the submicron fiber layer (meltblown fiber layer) formed by the meltblowing technology also has poor strength, and easily fluff and is easily damaged during the process of processing, furthermore, the submicron fiber layers formed by the meltblowing technology are bonded by forming the substrate and meltblown layer respectively and then performing compounding, resulting in poor bonding strength between layers, and delamination and peeling easily occurs during the process of processing and use.

The self-cleaning air filtering material provided by the present invention can be used for air filtration in many fields, such as air filtration of an industrial dust removal system, air intake system of an air compressor and filtration system of an internal combustion engine (including an automobile engine) and the like.

BRIEF DESCRIPTION OF THE DRAWINGS

Hereinafter, the embodiments of the present invention will be described in detail in combination with the accompanying drawings, wherein.

DETAILED DESCRIPTION OF THE EMBODIMENTS

The present invention will be described with reference to the specific examples. Those skilled in the art will understand that these examples are only intended to illustrate the present invention, without limiting the scope of the present invention in any way.

In the following examples and comparative examples, when the cross section of the fiber is not circular, the diameter of the fiber is represented by the maximum projected width of the fiber. The plant fibers used are selected from one or more of the group consisting of wood fibers, grass fibers, cotton fibers, bast fibers, mercerized fibers and other plant fibers. The non-plant fibers used are selected from one or more of the group consisting of nylon fibers, polyester fibers, polypropylene fibers, aramid fibers, acrylic fibers, polytetrafluoroethylene fibers, polyvinyl alcohol fibers, tencel fibers, richcel fibers, glass fibers and other non-plant fibers. The fibrillated fibers used are selected from one or more of the group consisting of the fibrillated tencel fibers, Richcel fibers, aramid fibers and other fibers capable of producing fibrils.

Example 1

Self-Cleaning Air Filtering Material of the Present Invention

This example provides a method for preparing the self-cleaning air filtering material.

Figure 3:
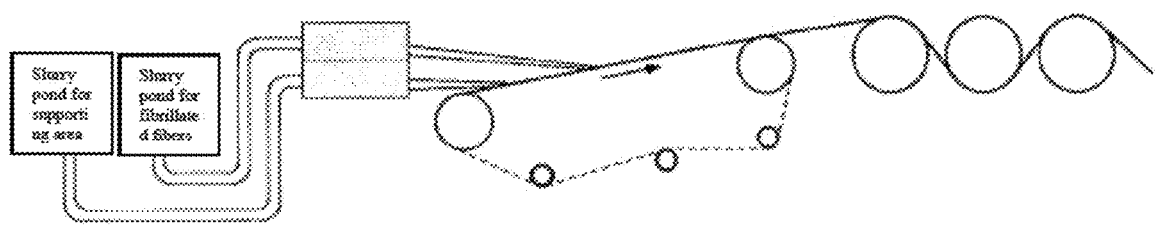
FIG. 3 is a schematic diagram illustrating the preparation of the self-cleaning air filtering material according to the present invention.

The process for preparing the self-cleaning air filtering material is as shown in FIG. 3, which is described detailedly in the following:

1) the slurry of the fibrillated tencel fibers and the slurry of the fibrillated aramid fibers for forming the submicron fiber layer were mixed at a weight ratio of 1:9 in a slurry pond to obtain the fiber suspension for the submicron fiber layer at a certain concentration;

2) the slurry of the wood fibers and the slurry of the polyester fibers for forming the supporting area were mixed at a weight ratio of 6:4 in another slurry pond to obtain the fiber suspension for the supporting area at a certain concentration;

3) the fiber suspension for the submicron fiber layer and the fiber suspension for the supporting area were respectively transmitted to a forming wire by a double-layer headbox, wherein the fiber suspension for the supporting area arrives at the forming wire prior to the fiber suspension for the submicron fiber layer so that the submicron fiber layer can be formed on the supporting area, then dehydration and drying were performed to obtain a finished paper.

Figure 1:
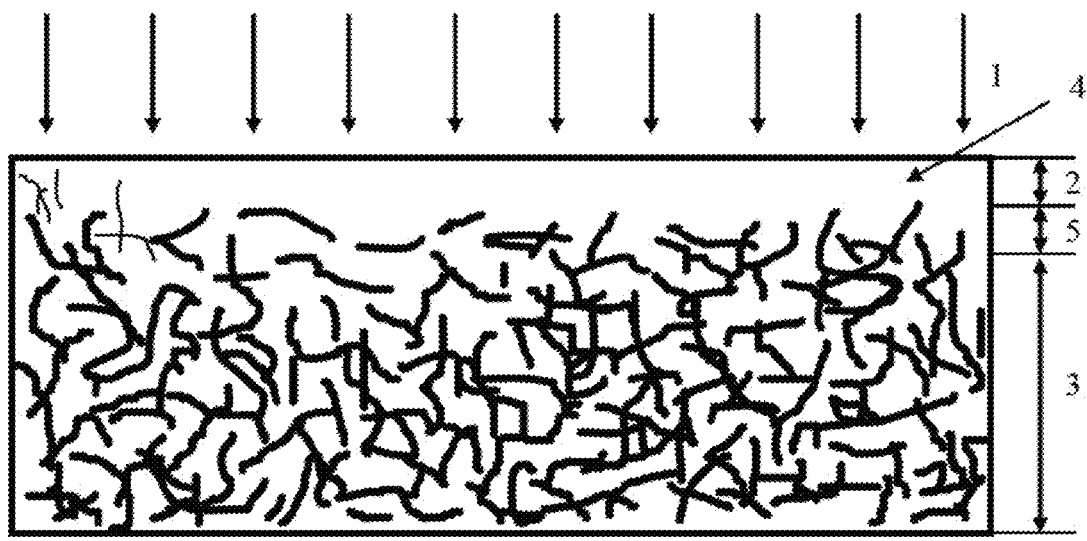
FIG. 1 is a structural schematic diagram of the self-cleaning air filtering material provided by the present invention, wherein 1 represents air flow direction, 2 represents the submicron fiber layer, 3 represents the supporting area, 4 represents the fibrillated fiber, 5 represents the mixed area.
Figure 2:
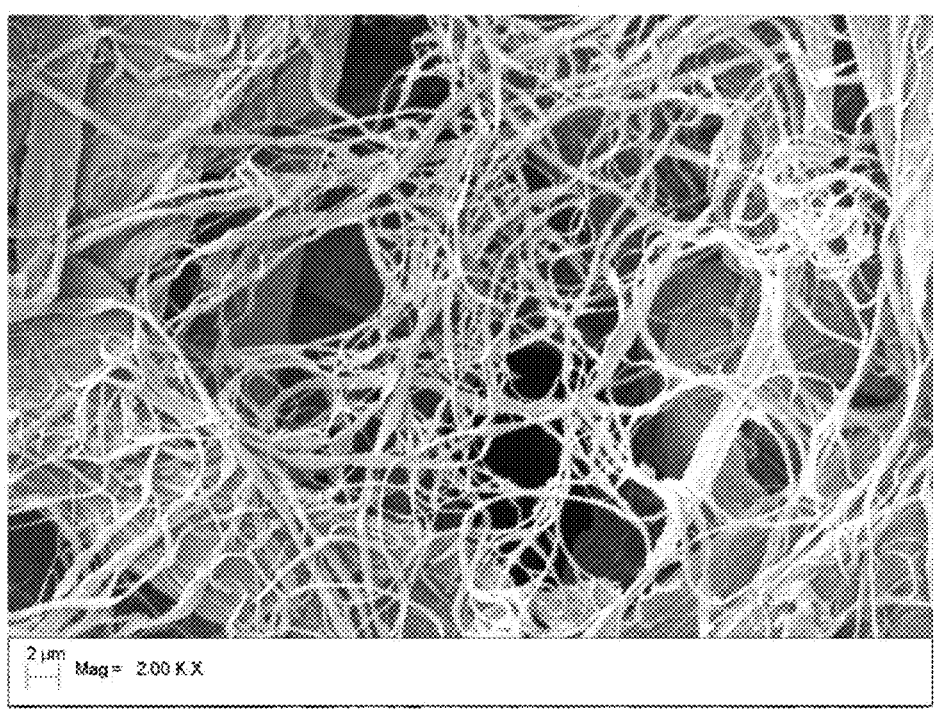
FIG. 2 is an electron micrograph of the fibrillated submicron fibers in the submicron fiber layer according to the present invention.

The structural schematic diagram of the self-cleaning air filtering material for automobile engine is shown in FIG. 1, according to an air flow direction 1, the self-cleaning air filtering material is divided into the submicron fiber layer 2 and the supporting area 3 and the mixed area 5 between the submicron fiber layer 2 and the supporting area 3.

Wherein the submicron fiber layer 2 consists of the fibrillated fibers with a basis weight of 1 g/m². Wherein the fibrillated fibers are a mixture of 10% fibrillated tencel fibers and 90% fibrillated aramid fibers, with structure shown in the electron micrograph of FIG. 3. The mixture of the fibrillated tencel fibers and aramid fibers has an average diameter of 150 nm, and an average length of 0.5 mm.

The supporting area 3 consists of plant fibers and non-plant fibers, with a basis weight of 90 g/m². Wherein the mass fraction of the plant fibers is 60%, and the mass fraction of the non-plant fibers is 40%. In the supporting area, the plant fibers are wood fibers, and the non-plant fibers are polyester fibers. The plant fibers have an average diameter of 13 μm, and an average length of 7 mm. The polyester fibers have an average diameter of 8 μm and an average length of 6 mm.

Comparative Example 1

Self-Cleaning Air Filtering Material Compounded by Electrospun Fibers

This comparative example is essentially identical to Example 1, except that in this comparative example, the electrospun submicron fiber layer was compounded on the formed supporting area by the electrospinning technology, wherein the average diameter of the electrospun fibers is 130 nm.

Comparative Example 2

Self-Cleaning Air Filtering Material Compounded by Meltblown Fibers

This comparative example is essentially identical to Example 1, except that in this comparative example, the meltblown submicron fiber layer was compounded on the formed supporting area by the meltblowing technology, wherein the average diameter of the meltblown fibers is 170 nm.

Comparative Example 3

Self-Cleaning Air Filtering Material Compounded by the Fibrillated Fibers

This comparative example is essentially identical to Example 1, except that in this comparative example, the fibrillated fiber layer was compounded on the formed supporting area by wet-compounding technology, wherein the average diameter of the fibrillated fibers is 160 nm.

The filtration performances of the above air filtering materials prepared in Example 1 and Comparative Examples 1-3 were tested, with results shown in the following table:

| | Example 1 | Comparative Example 1 | Comparative Example 2 | Comparative Example 3 |
|---|---|---|---|---|
| Thickness(mm) | 0.42 | 0.43 | 0.44 | 0.45 |
| Maximum pore size (μm) | 53.2 | 55.0 | 56.6 | 48.2 |
| Average pore size (μm) | 12.5 | 12.3 | 12.9 | 11.7 |
| Initial filtration efficiency (%, particle of 0.3 μm) | 65.8 | 66.3 | 63.4 | 65.6 |
| Tensile strength (KN/m) | 6.3 | 6.5 | 6.3 | 6.8 |
| Folding endurance test after 20 times | The structure is integrated | The electrospun submicron fiber layer is damaged | The meltblown submicron fiber layer is damaged | The fibrillated fiber layer and the supporting area are delaminated |

It can be see that, the maximum pore size, average pore size and initial filtration efficiency of Example 1 are close to that of Comparative Examples 1-3, however, after the folding endurance test was performed 20 times, the self-cleaning filtering material of Example 1 can still maintain an integrated structure, without damage, indicating that the self-cleaning filtering material compounded by submicron fibers in the present invention has good processing and service performances while maintaining other physical performances.

Example 2

Study on the Self-Cleaning Air Filtering Material of the Present Invention

The basis weight of the submicron fiber layer of the self-cleaning air filtering material was studied by reference to the preparation method of Example 1, wherein the supporting area comprises 60% wood fiber and 40% polyester fiber which has a diameter of 9 μm, with a basis weight of 90 g/m². The results are shown in Table 1.

TABLE 1

| | Basis weight of the submicron fiber layer (g/m²) | | | | | | | |
|---|---|---|---|---|---|---|---|---|
| | 0 | 0.5 | 1 | 3 | 5 | 8 | 10 | 12 |
| Maximum pore size (μm) | 35.0 | 31.3 | 28.3 | 26.4 | 22.2 | 14.3 | 9.12 | 7.37 |
| Average pore size (μm) | 20.1 | 17.8 | 12.8 | 3.5 | 2.2 | 1.5 | 0.8 | 0.6 |
| Initial filtration efficiency (%, particle of 0.3 μm) | 27.2 | 38.4 | 68.8 | 86.1 | 91.7 | 96.2 | 98.8 | 99.6 |
| Filtration resistance (Pa) | 13.6 | 18.3 | 25.5 | 120.7 | 243.5 | 543.5 | 900.8 | 1100.4 |

It can be seen from Table 1, although the filtration efficiency increases with increasing of the basis weight of the submicron fiber layer, the increasing speed of the filtration efficiency is significantly lower than that of the filtration resistance. Overhigh resistance is very unfavorable to the filtration process. Therefore, the basis weight of the submicron fiber layer is preferable not exceed 10 g/m².

What is claimed is:
1. A self-cleaning air filtering material, comprising a submicron fiber layer, a supporting area and a mixed area between the submicron fiber layer and the supporting area, wherein the mixed area is formed by contacting and mixing part of fibers in the submicron fiber layer and the supporting area with each other during the formation of the submicron fiber layer and the supporting area, the submicron fiber layer consists of fibrillated fibers which are a mixture of 10% fibrillated tencel fibers and 90% fibrillated aramid fibers, and the supporting area consists of fibrillated fibers which are a mixture of 60% plant fibers and 40% non-plant fibers.

2. The self-cleaning air filtering material according to claim 1, wherein the beating degree of the fibrillated fibers is 20° SR –95° SR.

3. The self-cleaning air filtering material according to claim 1, wherein the plant fibers are selected from one or more of the group consisting of wood fibers, grass fibers, cotton fibers, bast fibers and mercerized fibers; the non-plant fiber are selected from one or more of the group consisting of nylon fibers, polyester fibers, polypropylene fibers, aramid fibers, acrylic fibers, polytetrafluoroethylene fibers, polyvinyl alcohol fibers, tencel fibers, Richcel fibers and glass fibers.

4. The self-cleaning air filtering material according to claim 2, wherein the fibrillated fibers have an average fiber length of 0.1 mm-5 mm, and an average diameter of 20 nm-1000 nm.

5. The self-cleaning air filtering material according to claim 3, wherein the plant fibers have an average fiber length of 0.5 mm-10 mm and an average diameter of 5 μm-30 μm; the non-plant fibers have an average fiber length of 0.5 mm -10 mm and an average diameter of 5 μm-20 μm.

6. The self-cleaning air filtering material according to claim 1, wherein the basis weight of the submicron fiber layer is 0.1 g/m$^2$-10 g/m$^2$, and the basis weight of the supporting area is 10 g/m$^2$-150 g/m$^2$.

7. The self-cleaning air filtering material according to claim 1, wherein the self-cleaning air filtering material performs self-cleaning through blowing by back-flushing air stream.

8. A method for preparing the self-cleaning air filtering material according to claim 1, comprising: forming the submicron fiber layer and the supporting area at the same time by a double-layer headbox.

9. The method according to claim 8, wherein forming the submicron fiber layer and the supporting area at the same time comprises the following steps of:

transmitting fiber suspensions for the submicron fiber layer and the supporting area to a forming wire by a double-layer headbox, wherein the fiber suspension for the supporting area arrives at the forming wire prior to the fiber suspension for the submicron fiber layer so that the submicron fiber layer can be formed on the supporting area; during the process of formation, contacting and mixing part of fibers between the submicron fiber layer and the supporting area with each other to form the mixed area containing both the submicron fibers and fibers of the supporting area.

* * * * *